(12) United States Patent
Wang et al.

(10) Patent No.: US 9,877,367 B2
(45) Date of Patent: *Jan. 23, 2018

(54) POWERING INTERNAL COMPONENTS OF LED LAMPS USING DISSIPATIVE SOURCES

(71) Applicant: Dialog Semiconductor Inc., Campbell, CA (US)

(72) Inventors: Chuanyang Wang, San Jose, CA (US); Chenglong Zhang, Campbell, CA (US); Nan Shi, Newark, CA (US); Clarita C. Knoll, San Leandro, CA (US); Guang Feng, Cupertino, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,632

(22) Filed: Apr. 26, 2017

(65) Prior Publication Data

US 2017/0231050 A1    Aug. 10, 2017

Related U.S. Application Data

(63) Continuation of application No. 14/486,884, filed on Sep. 15, 2014.

(51) Int. Cl.
*H05B 33/08* (2006.01)
(52) U.S. Cl.
CPC ..... *H05B 33/0845* (2013.01); *H05B 33/0815* (2013.01)
(58) Field of Classification Search
CPC ............ H05B 33/0815; H05B 33/0845; H05B 33/0809; H05B 33/0851
(Continued)

(56) References Cited

U.S. PATENT DOCUMENTS 8,937,435 B1 *   1/2015   Sutardja ............. H05B 33/0815
                                                         315/219
9,282,606 B1 *   3/2016   Kuang ............... H05B 33/0815
(Continued)

FOREIGN PATENT DOCUMENTS

CN    201491324 U    5/2010
CN    102387639 A    3/2012
(Continued)

OTHER PUBLICATIONS

German Office Action, German Application No. 10 2015 215 658.3, dated Mar. 2, 2016, 12 pages.
(Continued)

*Primary Examiner* — Alexander H Taningco
*Assistant Examiner* — Renan Luque
(74) *Attorney, Agent, or Firm* — Fenwick & West LLP

(57) ABSTRACT

An LED lamp comprises one or more LEDs and an LED driver receiving an input signal from a dimmer switch indicative of an amount of dimming for the LED lamp. The LED driver controls regulated current through the one or more LEDs based on the input signal such that an output light intensity of the one or more LEDs substantially corresponds to the amount of dimming for the LED lamp. A regulated output provides operating power for the LED driver. A controller regulates the regulated output to power the LED driver. The controller selects a power source for charging the regulated output from two or more power sources, and the regulated output is charged using the power source selected by the controller.

15 Claims, 4 Drawing Sheets

(58) Field of Classification Search
USPC .............. 315/307, 85, 219, 224, 308, 200
See application file for complete search history.

(56) References Cited

U.S. PATENT DOCUMENTS

| | | | |
|---|---|---|---|
| 2010/0225240 A1 | 9/2010 | Shearer et al. | |
| 2012/0038292 A1 | 2/2012 | Kuo et al. | |
| 2012/0286663 A1 | 11/2012 | Puvanakijjakorn et al. | |
| 2012/0319621 A1* | 12/2012 | Sutardja | H05B 33/0815 315/307 |
| 2013/0278145 A1* | 10/2013 | Lin | H05B 33/0851 315/122 |
| 2014/0327372 A1* | 11/2014 | Zhang | H05B 33/0815 315/224 |
| 2014/0361623 A1* | 12/2014 | Siessegger | H05B 33/0803 307/64 |

FOREIGN PATENT DOCUMENTS

| | | |
|---|---|---|
| CN | 102342181 A | 2/2013 |
| CN | 103329618 A | 9/2013 |
| CN | 103379713 A | 10/2013 |
| CN | 103782088 A | 5/2014 |

OTHER PUBLICATIONS

United States Office Action, U.S. Appl. No. 14/486,884, dated Aug. 17, 2016, 15 pages.
United States Office Action, U.S. Appl. No. 14/486,884, dated Dec. 23, 2015, 13 pages.
United States Office Action, U.S. Appl. No. 14/486,884, dated Aug. 4, 2015, 13 pages.
Chinese First Office Action, Chinese Application No. 201510364290.2, dated Aug. 22, 2017, 17 pages.

* cited by examiner

POWERING INTERNAL COMPONENTS OF LED LAMPS USING DISSIPATIVE SOURCES

CROSS REFERENCE TO RELATED APPLICATIONS

This application is a continuation of U.S. application Ser. No. 14/486,884, filed Sep. 15, 2014, which is incorporated herein by reference in its entirety.

BACKGROUND OF THE DISCLOSURE

1. Field of the Invention

This disclosure relates to driving LED (Light-Emitting Diode) lamps and, more specifically, to generating a voltage for powering internal components of LED lamps.

2. Description of the Related Art

LEDs are being adopted in a wide variety of electronics applications, such as architectural lighting, automotive head and tail lights, backlights for liquid crystal display devices, and flashlights. Compared to conventional lighting sources such as incandescent lamps and fluorescent lamps, LEDs have significant advantages, including high efficiency, good directionality, color stability, high reliability, long life time, small size, and environmental safety.

The use of LEDs in lighting applications is expected to expand, as they provide significant advantages over incandescent lamps (light bulbs) in power efficiency (lumens per watt) and spectral quality. Furthermore, LED lamps represent lower environmental impact compared to fluorescent lighting systems (fluorescent ballast combined with fluorescent lamp) that may cause mercury contamination as a result of fluorescent lamp disposal.

However, conventional LED lamps cannot be direct replacements of incandescent lamps and dimmable fluorescent systems without modifications to current wiring and component infrastructure that have been built around incandescent light bulbs. This is because conventional incandescent lamps are voltage driven devices while LEDs are current driven devices, thus requiring different techniques for controlling the intensity of their respective light outputs.

Many dimmer switches adjust the RMS voltage value of the lamp input voltage by controlling the phase angle of the AC-input power that is applied to the incandescent lamp to dim the incandescent lamp. Controlling the phase angle is an effective and simple way to adjust the RMS-voltage supplied to the incandescent bulb and provide dimming capabilities. However, conventional dimmer switches that control the phase angle of the input voltage are not compatible with conventional LED lamps, since LEDs, and thus LED lamps, are current-driven devices.

One solution to this compatibility problem uses an LED driver that senses the lamp input voltage to determine the operating duty cycle of the dimmer switch and reduces the regulated forward current through an LED lamp as the operating duty cycle of the dimmer switch is lowered. An LED driver is an active device relying on a power source to operate. Many LED lamps provide a separate power source for the LED driver and other active components of the LED lamp. However, the use of a separate power source increases an amount of power used by the LED lamp for purposes other than illuminating the LEDs, thereby decreasing an overall efficiency of the LED lamp.

SUMMARY

To improve the overall operating efficiency of an LED lamp, a regulation unit (e.g., a capacitor) is charged using power sources within the LED lamp and the voltage across the regulation unit is used to power internal components of the LED lamp. In one embodiment, an LED lamp includes one or more LEDs and an LED driver. The LED driver receives an input signal from a dimmer switch that is indicative of an amount of dimming for the LED lamp and controls regulated current through the one or more LEDs based on the input signal such that an output light intensity of the one or more LEDs substantially corresponds to the amount of dimming for the LED lamp. A regulation unit is coupled to the LED driver, and a voltage across the regulation unit provides power to the LED driver to operate the LED driver. A controller provides a regulated output from the regulation unit to power the LED driver. The controller selects a power source for charging the regulation unit, and the regulation unit is charged using the selected power source. In one embodiment, the controller selects between a bleeder circuit, which is configured to generate a bleeder current in the LED lamp to maintain at least a threshold current in the dimmer switch, and one or more other power sources in the LED lamp, such as an inductor delivering power to the one or more LEDs.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

As will be explained in more detail below with reference to the figures, the LED lamp system and a method according to various embodiments uses dissipative sources to power internal components of the LED lamp. In particular, the LED lamp charges a regulation unit (such as a capacitor) to generate a Vcc voltage that is used for powering various active components of the lamp, such as one or more switch controllers. The LED lamp uses otherwise dissipative current sources, such as a bleeder circuit, to charge the regulation unit, thereby increasing an overall efficiency of the LED lamp.

Figure 1:
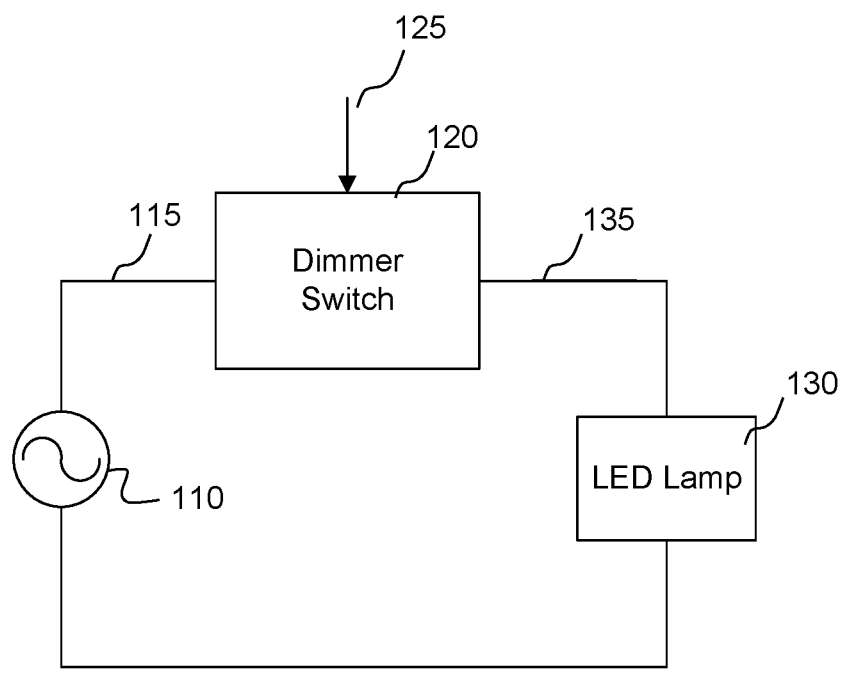
FIG. 1 illustrates an LED lamp circuit, according to one embodiment.

FIG. 1 illustrates an LED lamp system including an LED lamp 130 used with a conventional dimmer switch 120. The LED lamp 130 according to various embodiments is a direct replacement of an incandescent lamp in a conventional dimmer switch setting. A dimmer switch 120 is placed in series with AC input voltage source 110 and LED lamp 130. Dimmer switch 120 receives a dimming input signal 125 and uses the input signal 125 to set the desired light output intensity of LED lamp 130. Dimmer switch 120 receives AC input voltage signal 115 and adjusts the V-RMS value of lamp input voltage 135 in response to dimming input signal 125. In other words, control of the light intensity outputted by LED lamp 130 by dimmer switch 120 is achieved by adjusting the RMS value of the lamp input voltage 135 that is applied to LED lamp 130. The LED lamp 130 controls the light output intensity of LED lamp 130 to vary proportionally to the lamp input voltage 135, exhibiting behavior similar to incandescent lamps, even though LEDs are current-driven devices and not voltage driven devices. Dimming input signal 125 can either be provided manually (via a knob or slider switch, not shown herein) or via an automated lighting control system (not shown herein).

The dimmer switch 120 adjusts the V-RMS of lamp input voltage 135 by controlling the phase angle of the AC input voltage signal 115. In particular, the dimmer switch 120 reduces the V-RMS of input voltage 135 by eliminating a portion of each half-cycle of the AC input signal 115. Generally, the dimmer switch 120 increases the dimming effect (i.e., lowers the light intensity) by increasing the portion of each half-cycle that is eliminated and thereby decreasing the dimmer on-time. In one embodiment, the dimmer switch 120 employs a triac device to generate phase angle switching to adjust the lamp input voltage 135. Once triggered, the triac device continues to conduct current to the LED lamp 130 until the current falls below a threshold (referred to as a holding current).

Figure 2:
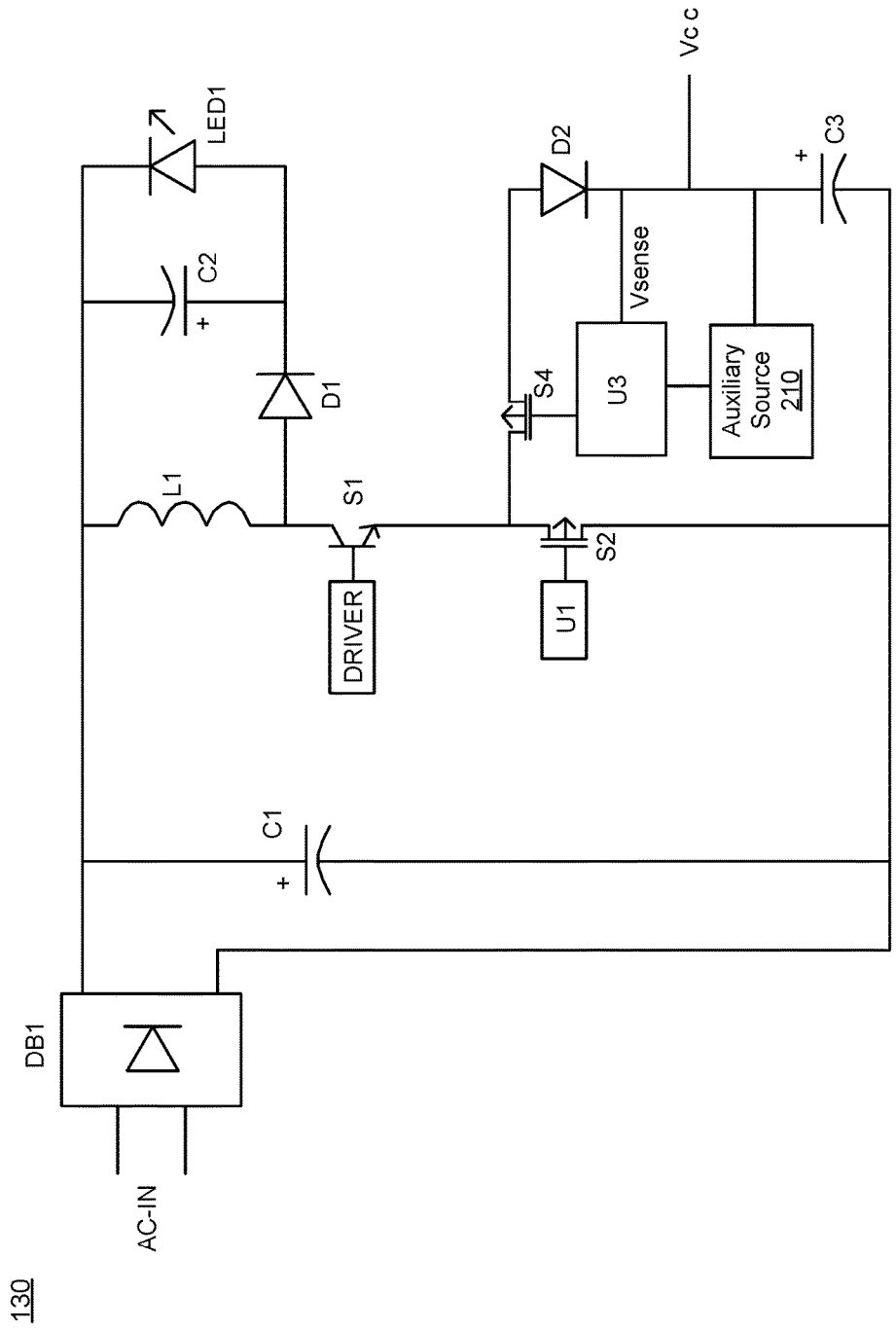
FIG. 2 is a block diagram illustrating components of an LED lamp, according to one embodiment.

FIG. 2 is a block diagram illustrating components of the LED lamp 130. In one embodiment, the LED lamp 130 comprises a bridge rectifier DB1, an input capacitor C1, an inductor L1, an output capacitor C2, a transistor S1, a power switch S2, at least one charging switch S4, and switch controllers U1 and U3. Other embodiments of the LED lamp 130 may comprise different or additional components.

The bridge rectifier DB1 rectifies the voltage signal 135 input to the LED lamp 130 by the dimmer switch 120 and provides the rectified voltage across the input capacitor C1. Inductor L1, diode D1, capacitor C2, transistor S1, and switch S2 form a non-isolated buck boost type power converter providing a regulated current output to one or more LEDs, such as LED1 shown in FIG. 2. In one embodiment, the transistor S1 is a bipolar junction transistor and is maintained in an on state to provide high voltage isolation. The controller U1 controls on and off cycles of the switch S2 (which is, for example, a field-effect transistor) to provide the regulated output current to LED1. When the switch S2 is turned on, power input to the LED lamp 130 is stored in the inductor L1. During off cycles of the switch S2, current is provided to LED1 across the capacitor C2. The controller U1 controls switching of switch S2 such that a substantially constant current is maintained through LED1. In one embodiment, the controller U1 receives a feedback voltage or current (not shown) indicating an output current through LED1, and controls switching of the switch S2 in response to the feedback. Furthermore, in one embodiment, the controller U1 receives a dimming signal from the dimmer switch 120 that is indicative of an amount of dimming for the LED lamp 130. In this case, the controller U1 controls current through LED1 such that an output light intensity from LED1 substantially corresponds to the amount of dimming for the LED lap lamp 130.

Charging switch S4, controller U3, and regulation unit C3 form a voltage charging circuit. The regulation unit C3 stores a voltage Vcc, which may be used to provide power to one or more internal components of the LED lamp 130 (such as the controllers U1 or U3). In one embodiment, the regulation unit C3 comprises one or more capacitors. The regulation unit C3 is charged using power from the drain terminal of the power switch S2 and power from one or more auxiliary sources 210. The controller U3 controls the auxiliary power source 210 and switching of the switch S4 to regulate the voltage stored by the regulation unit C3. The controller U3 receives a signal Vsense indicating an amount of voltage stored by the regulation unit C3 and regulates the auxiliary power source 210 and switching of the switch S4 to adjust the voltage. For example, if the signal Vsense indicates the voltage Vcc has fallen below a threshold, the controller U3 turns on the switch S4 or the auxiliary power source 210 to increase the voltage Vcc. The controller U3 may alternatively employ other regulation schemes to provide a regulated output voltage Vcc from the regulation unit C3.

The auxiliary power source 210 may be any of a variety of dissipative or non-dissipative current sources in the LED lamp 130. In one embodiment, the controller U3 selectively activates the switch S4 or the auxiliary power source 210 to improve an overall efficiency of the LED lamp 130. For example, if the auxiliary source 210 dissipates power from the LED lamp 130, the controller U3 charges the regulation unit C3 using power from the auxiliary source 210 when possible to recover a portion of the power that would otherwise be dissipated from the auxiliary source 210. Accordingly, the regulation unit C3 stores a portion of the energy that would otherwise be dissipated from the LED lamp 130 to power internal components of the LED lamp 130.

One example auxiliary power source 210 used by the controller U3 to charge the regulation unit C3 is a bleeder circuit. As described above, a triac device in the dimmer switch 120 conducts current to the LED lamp 130 when a current through the triac device exceeds a holding current. As LED lamps are more efficient than the incandescent bulbs conventionally used with dimmer switches, the current drawn by the LED lamp 130 may fall below the triac's holding current. If the current drawn by the LED lamp 130 is below the holding current, a bleeder circuit in the LED lamp is activated to draw additional current from the dimmer switch and thereby increase the current through the triac above the holding current.

Figure 3:
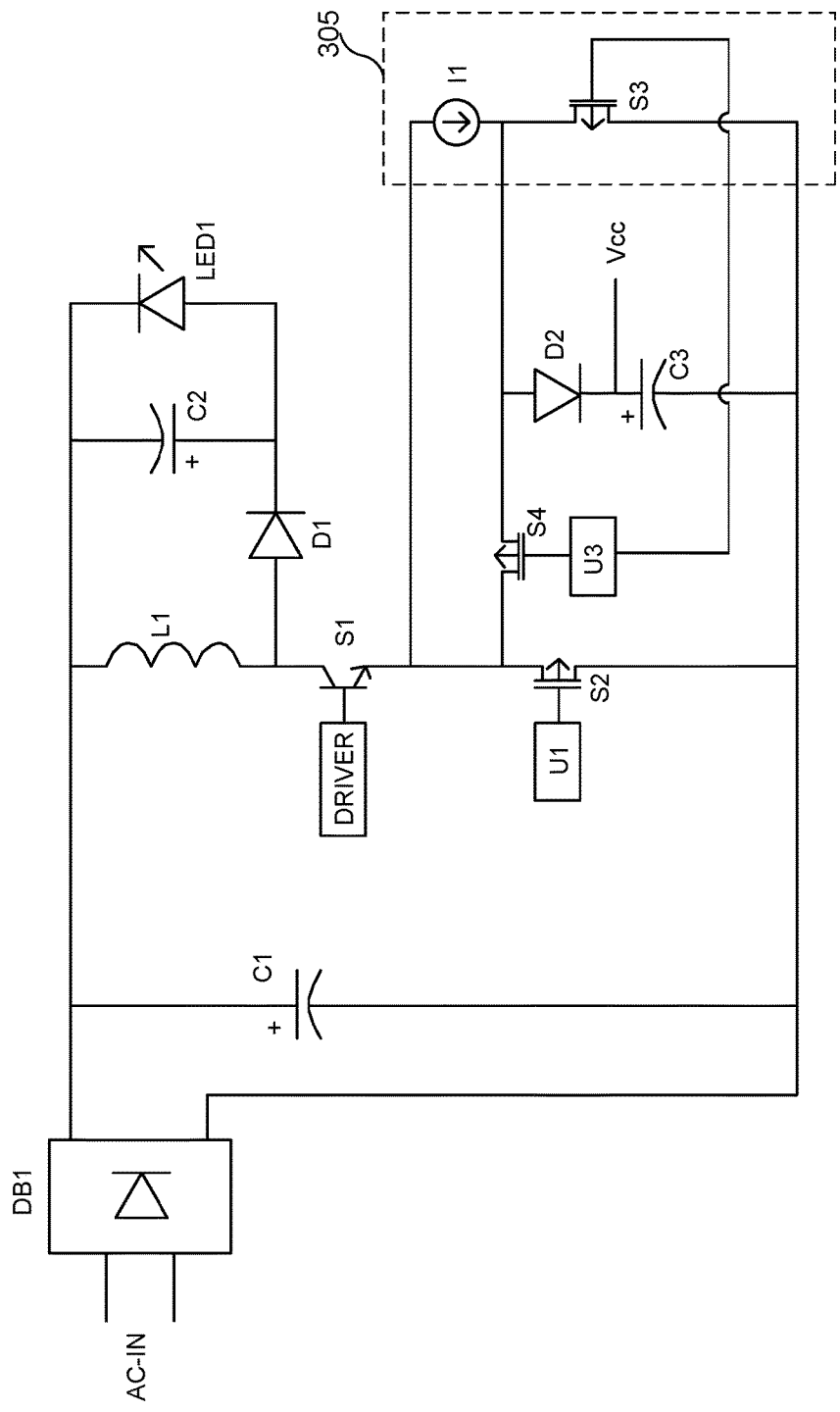
FIG. 3 is a block diagram illustrating a bleeder circuit in an LED lamp, according to one embodiment.

FIG. 3 illustrates one embodiment of the LED lamp 130 including an example bleeder circuit 305. In one embodiment, as shown in FIG. 3, the bleeder circuit 305 is coupled to the regulation unit C3 and includes a switch S3 and a current source I1 (comprising, for example, one or more resistors). As used herein, the term "coupled" may refer to both a direct connection between two components, as well as an indirect connection between the components. Numerous configurations of the bleeder circuit 305 other than that shown in FIG. 3 are possible. When the current source I1 is activated, the bleeder circuit 305 increases an amount of current drawn by the LED lamp 130 to maintain at least the threshold holding current through the triac device of the dimmer switch 120. In one embodiment, the controller U3 activates the bleeder circuit 305 in response to detecting the current through the triac device is below a threshold current (e.g., the holding current, or a specified amount above the holding current). In other embodiments, the LED lamp 130 includes a separate controller (not shown) receiving a signal indicating current through the triac device and activating or deactivating the bleeder circuit 305 based on the triac device's current.

In one embodiment, controller U3 controls switching of switch S3 to direct the bleeder current generated by the current source I1. When switch S3 is turned off, the bleeder current charges regulation unit C3 and thereby increasing the voltage Vcc stored by the regulation unit C3. When switch S3 is turned on, the bleeder current is dissipated to ground. Alternatively, a separate controller may control switching of switch S3 based on Vsense or a signal from the controller U3.

Figure 4:
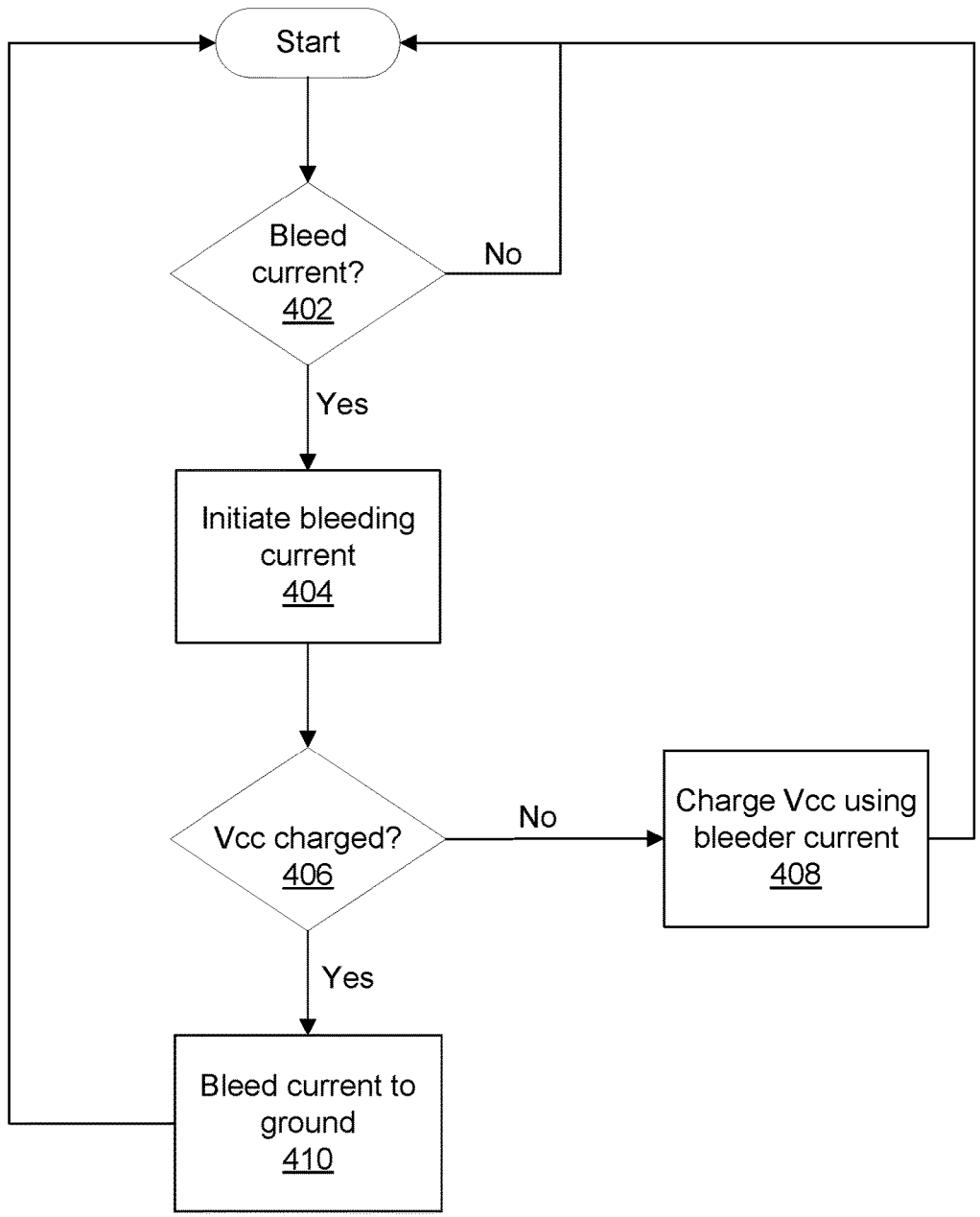
FIG. 4 is a flowchart illustrating a process for generating a voltage for powering internal components of the LED lamp, according to one embodiment.

FIG. 4 is a flowchart illustrating a process for generating a Vcc voltage for powering internal components of the LED lamp 130, according to one embodiment. In one embodiment, the steps of the process are performed by controller U3. Other embodiments may include fewer, different, or additional steps, and the steps may be performed in different orders.

The controller U3 determines 402 whether a bleeder current is needed in the LED lamp 130 to increase an amount of current through a triac device of the dimmer switch 120. For example, the controller U3 receives a signal indicative of the current loading of the triac device and compares the current loading to a holding current of the triac device. If a bleeder current is not needed (e.g., if the current load of the triac device is greater than the device's holding current), the controller U3 continues to monitor the current loading.

If the controller U3 determines 402 a bleeder current is needed to increase the current loading of the triac device, the controller U3 activates the current source I1 to initiate 404 a bleeding current. The controller U3 also measures the voltage Vcc across the regulation unit C3 and determines 406 whether Vcc is charged. For example, the controller U3 compares the measurement of Vcc to a threshold. If the measured voltage is less than the threshold, the controller U3 determines 406 Vcc is not charged. In this case, the controller U3 places switch S3 in an off state to charge 408 the regulation unit C3 using the bleeder current.

If the controller U3 determines 406 Vcc is charged (e.g., if the measured voltage exceeds the threshold), the controller U3 allows 410 the bleeder current to bleed to ground. For example, the controller U3 places switch S3 in an on state, allowing the bleeder current generated by current source I1 to bypass the regulation unit C3 and bleed to ground.

The LED lamps according to various embodiments of the present disclosure have the advantage that the LED lamp can be a direct replacement of conventional incandescent lamps in typical wiring configurations found in residential and commercial lighting applications, and that the LED lamp can be used with conventional dimmer switches that carry out dimming by changing the input voltage to the lamps. Moreover, because internal components of the LED lamp are powered using dissipative power sources of the LED lamp (such as a bleeder circuit maintaining at least a threshold current through the dimmer switch coupled to the LED lamp), LED lamps according to various embodiments described herein are more efficient than LED lamps employing a separate power source to power internal components.

Upon reading this disclosure, those of skill in the art will appreciate still additional alternative designs for an LED lamp. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

What is claimed is:
1. A light-emitting diode (LED) lamp, comprising:
   one or more LEDs;
   an LED driver receiving an input signal from a dimmer switch indicative of an amount of dimming for the LED lamp, the LED driver controlling a regulated current through the one or more LEDs based on the input signal such that an output light intensity of the one or more LEDs substantially corresponds to the amount of dimming for the LED lamp;
   a regulated voltage providing operating power for a plurality of controllers of the LED lamp controlling a plurality of switches of the LED lamp; and
   a controller of the plurality of controllers regulating the regulated voltage, the controller selecting a power source for charging the regulated voltage from two or more power sources comprising an input current of the LED lamp supplying the one or more LEDs with the regulated current and a bleeder circuit that when activated generates a bleeder current in the dimmer switch.

2. The LED lamp of claim 1, wherein the controller selects a power source of the two or more power sources dissipating a higher amount of energy to charge the regulated voltage.

3. The LED lamp of claim 1, wherein the bleeder circuit comprises a current source and one or more switches of the plurality of switches, and wherein the controller controls switching of the one or more switches to activate the current source to generate the bleeder current.

4. The LED lamp of claim 1, wherein the controller is further adapted to:
   charge the regulated voltage by the bleeder current responsive to detecting the regulated voltage is below a threshold voltage; and
   dissipate the bleeder current to a ground node of the LED lamp responsive to detecting the regulated voltage is above the threshold voltage.

5. The LED lamp of claim 1, wherein the controller is further adapted to:
   receive a signal from the dimmer switch indicating an amount of current through the dimmer switch; and
   responsive to the signal indicating the amount of current through the dimmer switch being below a threshold amount, activate the bleeder circuit.

6. The LED lamp of claim 1, further comprising:
   an inductor coupled to an input of the LED lamp and the one or more LEDs;

wherein the LED driver comprises a switch coupled to the inductor, energy stored in the inductor during on cycles of the switch and transferred to the one or more LEDs during off cycles of the switch.

7. The LED lamp of claim 6, wherein the inductor is coupled to the regulated voltage, and wherein the controller selects between the input current flowing through the inductor and one or more other power sources comprising the bleeder circuit for charging the regulated voltage.

8. The LED lamp of claim 1, wherein the regulated voltage is provided by a regulation unit, the regulation unit comprising a capacitor.

9. A method for driving a light-emitting diode (LED) lamp comprising one or more LEDs, an LED driver, and a regulated voltage providing operating power for the LED driver, the method comprising:
   receiving an input signal from a dimmer switch indicative of an amount of dimming for the LED lamp;
   controlling, with the LED driver, a regulated current through the one or more LEDs based on the input signal such that an output light intensity of the one or more LEDs substantially corresponds to the amount of dimming for the LED lamp;
   providing the regulated voltage to power a plurality of controllers of the LED lamp controlling a plurality of switches of the LED lamp; and
   selecting a power source for charging the regulated voltage from two or more power sources comprising an input current of the LED lamp supplying the one or more LEDs with the regulated current and a bleeder circuit that when activated generates a bleeder current in the dimmer switch.

10. The method of claim 9, further comprising:
   selecting a power source of the two or more power sources dissipating a higher amount of energy to charge the regulated voltage.

11. The method of claim 9, wherein the bleeder circuit comprises a current source and one or more switches of the plurality of switches, the method further comprising:
   controlling switching of the one or more switches to activate the current source to generate the bleeder current.

12. The method of claim 9, further comprising:
   charging the regulated voltage by the bleeder current responsive to detecting the regulated voltage is below a threshold voltage; and
   dissipating the bleeder current to a ground node of the LED lamp responsive to detecting the regulated voltage is above the threshold voltage.

13. The method of claim 9, further comprising:
   receiving a signal from the dimmer switch indicating an amount of current through the dimmer switch; and
   responsive to the signal indicating the amount of current through the dimmer switch being below a threshold amount, activating the bleeder circuit.

14. The method of claim 9, wherein the LED lamp further comprises an inductor and a switch coupled to the inductor, the inductor coupled to an input of the LED lamp and the one or more LEDs, the method further comprising:
   storing energy in the inductor during on cycles of the switch and transferring energy to the one or more LEDs during off cycles of the switch.

15. The method of claim 14, wherein the inductor is coupled to the regulated voltage, and the method further comprising:
   selecting between the input current flowing through the inductor and one or more other power sources comprising the bleeder circuit for charging the regulated voltage.

* * * * *